United States Patent [19]

Trautvetter et al.

[11] 3,997,705

[45] Dec. 14, 1976

[54] METHOD OF COAGULATING A FLUORO-ELASTOMER FROM AN AQUEOUS DISPERSION THEREOF

[75] Inventors: Werner Trautvetter, Troisdorf-Spich; Gregor Weisgerber, Konigswinter-Berghausen, both of Germany

[73] Assignee: Dynamit Nobel Aktiengesellschaft, Troisdorf, Germany

[22] Filed: July 8, 1975

[21] Appl. No.: 594,186

[30] Foreign Application Priority Data

July 11, 1974 Germany .......................... 2433265
Oct. 1, 1974 Germany .......................... 2446748

[52] U.S. Cl. ................................. 526/27; 526/41; 526/46; 526/49; 526/50; 526/54; 528/487; 528/492
[51] Int. Cl.² ...................... C08C 1/15; C08C 3/00; C08F 6/20; C08F 8/30
[58] Field of Search ............. 526/2, 49, 41, 27, 50; 528/487, 492

[56] References Cited

UNITED STATES PATENTS 2,576,909  11/1951  Adams .............................. 260/85.1
3,004,005  10/1961  Malz et al. .......................... 260/79

*Primary Examiner*—William F. Hamrock
*Attorney, Agent, or Firm*—Burgess, Dinklage & Sprung

[57] ABSTRACT

A process for coagulating a fluoro-elastomer in an aqueous medium which comprises adding to an aqueous acidic medium thereof an organic base or salt thereof which acts as a vulcanization accelerator.

47 Claims, No Drawings

METHOD OF COAGULATING A FLUORO-ELASTOMER FROM AN AQUEOUS DISPERSION THEREOF

BACKGROUND OF THE INVENTION

1. Field of the Invention

This invention relates to a method of coagulating a fluoro-elastomer in the form of a dispersion in an aqueous medium whereby in a simple one-step process a fluoro elastomer is formed which uniformly contains a cross-linking system. More particularly, this invention is directed to a process for coagulating a fluoro-elastomer wherein the final cross-linked product has superior properties. This invention is particularly directed to an economic means for the coagulation of a fluoro-elastomer from an aqueous acidic medium.

2. Discussion of the Prior Art

Elastomeric copolymers of vinylidene fluoride ($VF_2$), hexafluoropropylene (HFP) and/or pentafluoropropylene (PFP) and in some cases other fluorinated olefins such as vinyl fluoride (VF) or tetrafluoroethylene (TFE) are used mainly in a corss-linked form for the manufacture of seals, hoses, coatings, and the like which are resistant to heat, chemicals and oils. These copolymers are obtained as a rule by free radical copolymerization in an aqueous phase. Hence, the result of the polymerization is a dispersion or latex of polymer. The fluoro-elastomers are then precipitated from the dispersion whereby a coagulate is formed. The coagulate is then mechanically separated from the aqueous phase, washed and dried and prepared. It is often prepared in the form of a slab or block. Finally, there is added thereto, usually by a fabricator, a vulcanizing additive and a vulcanizing agent which assists in the cross-linking.

Precipitating agents heretofore employed are usually inorganic coagulants such as hydrochloric acid or a potassium alum or a magnesium chloride. One difficulty with such a system lies in the necessity of separating the coagulant virtually completely from the isolated polymer before the latter is used. If this is not done delays are encountered in the vulcanization of the elastomer and, under certain circumstances, the properties of the vulcanized end product are impaired.

It has previously been proposed to employ as a coagulant small amounts of water-soluble aliphatic polyamine. Such as been proposed in German Auslegeschrift No. 2,008,192. The amount of water soluble aliphatic polyamine unfortunately had to measured quite precisely. On the one hand it was required to be small enough so that residues remaining in the polymer would have no adverse effect on the properties of the polymer in the subsequent drying and vulcanization. On the other hand, it had to be present in sufficient quantity to produce as complete a coagulation as possible. While on a laboratory scale it may have been possible, in operations on a large commercial or technical scale it proved to be quite difficult to maintain the amount of polyamine within the very narrowly defined ranges for suitable operation. Even very slight excesses or shortages resulted in end products having undesirable properties.

Another disadvantage in the use of the known coagulants resided in the fact that a fine distribution of the required vulcanization system consisting of the vulcanizer and the vulcanization accelerator after the coagulation or after the slabbing presented greater difficulties. For instance, a uniform distribution of the vulcanizing system in the fluoro-elastomer was essential to the preparation of a uniform vulcanizate having optimum reproducible properties.

It therefore became desirable to provide a simple means whereby the fluoro-elastomer could be readily coagulated or precipitated from the aqueous medium so that the same would be in a condition ready for a vulcanization step. More particularly, it became desirable to provide a new coagulating agent which would readily coagulate the fluoro-elastomer latex whereby the same would be in a condition for vulcanization without subsequent addition of vulcanization accelerators. More especially, it became desirable to provide a means for coagulating the fluoro-elastomer latex whereby the final vulcanized product had superior properties.

SUMMARY OF THE INVENTION

The above objects are provided in accordance with the invention which provides a method for coagulating a fluoro-elastomer in an aqueous medium which method comprises introducing into an aqueous acidic medium of the fluoro-elastomer an organic base or salt thereof which acts as a vulcanization accelerator.

In accordance with this invention it has been discovered that optimum of coagulation of the fluoro-elastomer can be obtained if one introduces directly into the medium containing the fluoro-elastomer dispersion a vulcanization accelerator which is an organic base or a salt of an organic base which has the properties of acting as a vulcanization accelerator. Organic bases acting as vulcanization accelerators include preferably secondary or tertiary aliphatic, cycloaliphatic, heterocyclic or araliphatic monofunctional amines or their salts having a boiling point greater than 150° C; quaternary aliphatic, cycloaliphatic, araliphatic or heterocyclic ammonium compounds; and quaternary aliphatic, cycloaliphatic or araliphatic phosphonium compounds, or mixtures thereof.

Examples of phosphonium compounds acting as vulcanization accelerators are set forth in U.S. Pat. No. 2,712,877, the disclosure of which is hereby incorporated herein by reference. For example suitable phosphonium compounds for introduction into the fluoro-elastomer dispersion include butyl or dodecyl triphenylphosphonium bromide or chloride, benzyl or allyl triphenylphosphonium chloride or bromide, as well as the corresponding quaternary phosphonium bases and the like. The four organic radicals bound to each phosphoratom may be identical or different. Each radical can have between 1 to 20 carbon atoms or more although it preferably contains 2 to 8 carbon atoms. The carbon chain can be linear, branched or cyclic, and saturated or unsaturated, and it can contain substituents such as oxygen, nitrogen or sulfur. The chains can be any of the wide variety of organic residues particularly alkyl and alkenyl groups. When cyclic they can be heterocyclic aryl or araliphatic. When branched they can be branched alkyl groups or branched cycloaliphatic groups such as branched cycloalkanes, e.g., the radical corresponding to methylcyclopentane. The anion of the phosphonium compound can be, for example, hydroxyl, chloride, bromide, methoxy, acetate, mercaptate, sulfate, bisulfate, perchlorate, and the like.

Examples of quaternary ammonium compounds which can be employed as organic bases or organic base salts are those vulcanization agents named in German Offenlegungsschriften Nos. 2,123,110 and 2,128,473, the disclosures of which are hereby incorporated herein by reference. It should be understood that the quaternary ammonium compounds can have a wide variety of formulae, for example:

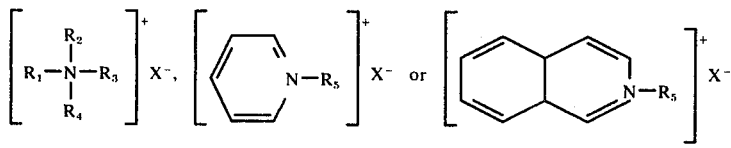

Referring to the formulae above $R_1$, $R_2$, $R_3$ and $R_4$ can each independently represent a $C_1$-$C_{20}$ alkyl group, a fluoroalkyl group containing up to 20 carbon atoms therein, an aralkyl group wherein the alkyl portion contains up to 20 carbon atoms and the aryl group contains up to 18 ring carbon atoms, polyhydroxyalkylene or polyhydroxyfluoroalkylene radicals which can contain up to 20 carbon atoms, provided that at least two of the radicals $R_1$, $R_2$, $R_3$ and $R_4$ are alkyl or aralkyl radicals.

Referring to the second and third formulae set forth above $R_5$ represents a $C_1$-$C_{20}$ alkyl radical. In all of the formulas X can represent a wide variety of anions especially a hydroxyl ion, a halogen ion, a sulfate ion, a perchlorate ion, a carbonate ion, a pentachlorothiophenolate ion, a tetrafluoroborate ion, a hexafluorosilicate ion, a hexafluorophosphate ion, a dimethylphosphate ion or a $C_1$-$C_{20}$ alkyl, aralkyl or arylcarboxylate or aryldicarboxylate ion.

Suitable for the purpose of the invention are especially the quaternary aliphatic ammonium halides such as tetrabutylammonium iodide, hexadecyltrimethylammonium chloride, and methyltrioctylammonium chloride, especially the quaternary ammonium compounds wherein the nitrogen atom is bonded to four radicals each of which can be alkyl of 1 to 20 carbon atoms, e.g., 1 to 8 carbon atoms or alkenyl of 2 to 20 carbon atoms, e.g. 2 to 8 carbon atoms. Where the compound is a cycloaliphatic amine or quaternary ammonium compound at least one of the groups is cyclic. The others can be straight chain, branched chain, or cyclic. The cyclic group can be saturated or unsaturated and can contain 4 to 20 carbon atoms in the ring, preferably 4 to 8 carbon atoms in the ring. The non-cyclic radicals are preferably alkyl of 1 to 20 carbon atoms or alkenyl of 2 to 20 carbon atoms. If a heterocyclic group is bonded to a nitrogen atom in the amine or quaternary ammonium compound the heterocyclic can contain between 3 and 6 carbon atoms in the ring, preferably 3 to 5 carbon atoms in the ring. The heterocyclic compound can contain as the hetero atom nitrogen, oxygen or sulfur. Where a secondary or tertiary monofunctional amine is employed the nitrogen atom is preferably bonded to an alkyl or alkenyl group. The alkyl group can contain from 1 to 20 carbon atoms and the alkenyl can contain from 2 to 20 carbon atoms in the chain.

DISCUSSION OF PREFERRED EMBODIMENTS

In the operation of the process of the invention it is preferable to employ a quaternary ammonium or phosphonium salt. On account of their easy accessability through the alkylation of the tertiary amines and phosphines, the halides of the quaternary ammonium and phosphonium bases are employed, as a rule. These salts differ greatly in their solubility in water. For example, the araliphatic phosphonium chlorides and bromides having short alkyl chains are readily soluble in water so that the amount of salt that is in the elastomer after the precipitation process is not precisely known or depends on factors such as concentration of the latex, speed of precipitation, temperature and similar paramaters.

However, since in the subsequent vulcanization of the fluoro-elastomer the phosphonium salt acts as an accelerator, the speed of vulcanization is not always reproducible. For this reason it is preferred to employ a phosphonium or ammonium compound which is insoluble or poorly soluble in water and which will precipitate in a virtually quantitative manner upon the precipitation of the elastomer. Examples of such poorly soluble ammonium salts are those having long alkyl chains such as trimethylhexadecyl ammonium chloride and trioctyl ammonium chloride and the like.

The quaternary phosphonium and ammonium perchlorates are also particularly desired owing to their very poor solubility in water. They are, however, more readily soluble in methanol. Hence, they are well suited for the coagulation of acid fluoro-elastomer latices and are excellent vulcanization accelerators because they precipitate virtually quantitatively together with the elastomer into a finely divided form. Another advantage of the use of such perchlorates lies in the fact that they crystallize better than the halides and consequently can be more easily prepared in pure form.

The preparation of the phosphonium and ammonium perchlorates has been described occasionally in the literature. One general method for their preparation comprises adding a dilute aqueous magnesium perchlorate solution, with stirring, to an aqueous, aqueous-methanolic or aqueous-ethanolic solution of the corresponding ammonium or phosphonium halide. The perchlorate will then precipitate, after the addition of more water in some cases. After they have been removed by filtration they are dried. In dried form they are relatively pure.

Basically all of the perchlorates of the above-named phosphorus compounds are suitable as quaternary phosphonium perchlorates.

The preferred organic radicals are the benzyl, allyl, and n-butyl radicals as well as the phenyl radical. Phosphonium perchlorates containing other radicals, however, can also be used. The four organic radicals bound to each phosphoratom can be the same or different. Each radical can have 1 to 20 carbon atoms therein or more although preferably each radical contains 2 to 8 carbon atoms. The carbon chain can be linear, branched or cyclic. It can be saturated or unsaturated and it can contain substituents such as oxygen, nitrogen or sulfur, It can be in the form of an alkyl radical, an alkenyl radical, a cycloalkyl radical, a heterocyclic radical or an aralkyl radical, to name a few.

With respect to the quaternary ammonium perchlorates employed these are preferably those quaternary ammonium perchlorates which fall within the above given formulae. For the purpose of the invention, the quaternary aliphatic ammonium perchlorates which are especially suitable, these including tetrabutylammonium perchlorate, hexadecyltrimethylammonium perchlorate, methyltrioctylammonium perchlorate, n-dodecyltriethylammonium perchlorate and n-octyl-tri-n-butylammonium perchlorate.

The amount of the vulcanizing agent, e.g., perchlorate added to the dispersion for the purposes of coagulation is generally between 0.2 and 20, preferably from 0.5 to 5 millimoles of vulcanizing agent per 100 g of anhydrous elastomer.

Examples of additional vulcanization accelerators are: tetramethylammonium hydroxide, tetramethylammoniumpentachlorothiophenolate, lauryldimethylnaphthylmethylammonium chloride, laurylisoquinoline chloride, distearyldimethylammonium chloride, tetrahexylammonium tetrafluoborate, methyltrioctylammonium oxalate, hexadecylpyridinium chloride, benzyltrioctylammonium chloride, diisobutylphenoxyethoxy-ethyldimethoxybenzylammonium chloride, methoxyethoxyethyl-trioctylammonium chloride, 2,2,3,3-tetrafluoropropyltrioctylammonium chloride.

Examples of monofunctional amines which are used in accordance with the invention are dibutylamine, dicyclohexylamine, tributylamine and ethyldicyclohexylamine, and their salts.

In a particularly preferred embodiment of the invention there is additionally introduced into the fluoroelastomer dispersion a polyhydroxy compound which acts as a vulcanizer. The purpose of introducing the polyhydroxy compound is to utilize an additional precipitant. Generally, in such an instance the coagulation is performed with the simultaneous use of a mononuclear or polynuclear aromatic polyhydroxy compound which is difficultly soluble in water and acts as a vulcanizer. This preferred procedure has the advantage that all of the cross-linking system will be contained in the fluoro-elastomer after the coagulate is dried. This results in a considerable saving of time and work and eliminates the need for the fabricator to incorporate these agents afterwards.

Preferably the mononuclear or polynuclear aromatic polyhydroxy compound has a solubility in water less than 1 g per 100 ml. water determined at 25° C.

Examples of mononuclear polynuclear aromatic polyhydroxy compounds which can be employed are those difficultly soluble compounds which act as the vulcanizers and are described in German Offenlegungsschriften No. 2,255,170 and 2,128,473, the disclosures of which are hereby incorporated herein by reference.

Those suitable for the purpose of the invention are, for example, di-, tri- and tetrahydroxybenzenes, -naphthalines or -anthracenes, as well as bisphenols of the general formula

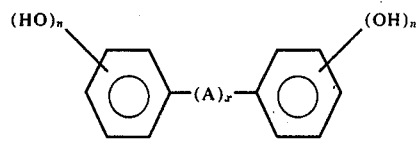

in which A represents a bifunctional, aliphatic, cycloaliphatic or aromatic radical having 1 to 13 carbon atoms, or a thio, oxy, carbonyl, sulfinyl or sulfone radical. The radical A can, if desired, be substituted by at least one chlorine or fluorine atom. X is 0 or 1, n = 1 or 2. The OH groups can be bound in each ring at any desired position. A can also be a radical of the formulas

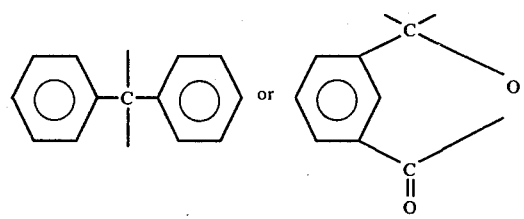

or, for example, a five-membered or six-membered heterocyclic radical, such as

Polynuclear aromatic dihydroxy compounds are preferred in accordance with the invention. Examples are: dihydroxybiphenyls, such as p,p'-biphenol, dihydroxy compounds of the bisphenol type, such as bisphenol A, bisphenol AF (hexafluorisopropylidene-bis-4-hydroxybenzene), bisphenol S (4,4'-dihydroxydiphenylsulfone), bisphenol Z (1,1-bis-p-hydroxyphenyl)-cyclohexane), dihydroxybenzophenones, and phenolphthalein.

Additional polyhydroxy compounds acting as vulcanizers, which can be used in accordance with the invention, are, for example, 2,2', 4,4'-tetrahydroxybenzophenone, pyrocatechol, resorcinol, 2-methylresorcinol, 5-methylresorcinol, 2-methylhydroquinone, 2,5-dimethylhydroquinone, 2-tert.-butyl-hydroquinone, 1,4,9,10-tetrahydroxyanthracene, 2,4-dihydroxybenzoic acid, 2,6-dihydroxyanthraquinone, 3,6-dihydroxyanthone, pyromellitic acid-bis-(p-hydroxyphenylimide), 2,4-dihydroxyacetophenone, 4,4'-dihydroxydiphenyl-sulfoxide, 2,4-dibenzoresorcinol, 2,4,5-trihydroxybutyrophenone and 2,4-dihydroxybenzaldehyde, and the like.

It is desirable to add the organic base and/or aromatic polyhydroxyl compound employed as a coagulant in accordance with the invention to the fluoro-elastomer latex in the form of a solution. A solvent for the purpose of forming a solution should be one which is miscible with water such as methanol, ethanol, acetone, dimethylformamide, dimethylsulfoxide and the like.

One can add the solutions of the base or salt thereof and the polyhydroxy compound to the latex in a mixture. However the two solutions can also be added separately in which case care should be taken to see that the addition of the two solutions takes place simultaneously.

The amount of the mononuclear or polynuclear aromatic polyhydroxy compound that is difficultly soluble in water is, as a rule, to be such that, after the precipitation, isolation and drying, 5 to 15 millimoles of vulcanizer (crosslinking agent) will be contained in 100 g of water-free fluoro-elastomer. When a polyhydroxy compound that is virtually insoluble in water is used, this amount will be equal to the amount that is added to the latex. In the case of polyhydroxy compounds which are not so insoluble in water (at room temperature), the amount to be added is to be correspondingly greater.

The fluoro-elastomer latex is prepared in a known manner by the copolymerization of $VF_2$ and HFP and-/or PFP and, if desired, additional fluorine-containing olefins such as VF or TFE, in an aqueous dispersion, in the presence of a water-soluble peroxidic catalyst, and also, if desired, in the presence of an anionic emulsifier, in the presence, in some cases, of a chain transfer agent.

The salt of perfluoroctanoic acid or of perfluoroctanesulfonic acid is used preferentially as the anionic emulsifier. The type and amount of the emulsifier, catalyst or other additives are to be such that the pH value of the fluoro-elastomer latex will adjust itself to from 2.0 to 4.0. The fluoro-elastomer latex will contain preferably 10 to 30%, by weight, of solids.

The fluoro-elastomers will be preferably those polymers which consist of 15 to 25 mole percent of HFP and/or PFP and 75 to 85 mole percent of $VF_2$ of which as much as 20 mole percent can be replaced by a different fluoroolefin such as VF or TFE. The reduced viscosity ($\eta_{red}$) of such fluoro-elastomers, measured at 30° C on an 0.5% solution in acetone, will be from 60 to 400 ml/g; the molecular weight ($M_n$), (measured osmotically in tetrahydrofuran), will be about 50,000 to about 200,000.

As a rule, when the accelerator that is used in accordance with the invention, with or without the vulcanizer, is added to the acid fluoro-elastomer latex, the latex will coagulate completely, with a simultaneous and uniform inclusion of the chemicals added. It is desirable to agitate the mixture vigorously, in a high-speed mixer for example, while the accelerator is being added. If the coagulation is incomplete, it is completed with conventional precipitants, such as $MgCl_2$ solutions for example. In this case the amount of this additional precipitant that is required is several times smaller than in the case of precipitation with conventional precipitants alone.

The separation of the coagulate from the solution can be accomplished by screening or centrifugation, for example. The washing of the coagulate separated from the solution is unnecessary as a rule. The product can be dried immediately, for example by 5 minutes of rolling at 100° C or by leaving it overnight in a fresh-air drying oven at 70° C.

When both the organic base employed in accordance with the invention and the polyhydroxy compound are used for the coagulation, all the fabricator needs to add to the fluoro-elastomers prior to vulcanization is the inorganic ingredients such as carbon black, magnesium oxide, calcium hydroxide and the like, since the fluoro-elastomer already contains the crosslinking system.

If the vulcanizer, i.e., the polyhydroxy compound, is relatively readily soluble in water, as in the case of hydroquinone, for example, one can use the accelerator only for the precipitation of the latex and thereafter the polyhydroxy compound can be added to the fluoro-elastomer after the same has been precipitated, separated and dried. Even if in this embodiment of the process the maximum advantage is not realized this procedure nevertheless is decidedly superior to adding the two components to the precipitate subsequently, as advocated by the prior art.

The advantages of the method of the invention manifest themselves especially in those cases in which the cross-linking system is either very slow to react or is not easily miscible with the polymer so that sufficient crosslinking is not achieved due to inhomogeneities in the mixture.

In order to more fully illustrate the nature of the invention and the manner of practicing the same the following examples are presented. In the examples below the cross-linking action of the precipitated, separated and dried fluoro-elastomers was tested in a standard vulcanization formula and the quality of the resultant vulcanizates was optically evaluated as "flawless" "bubbly," etc. Additionally, conventional tests were performed on a number of the vulcanizates for the purpose of determining their physical properties. When compression set measurements were taken these were done in accordance with Deutsche Industrie Norm 53,517. Tensile strength and elongation at rupture measurements were taken pursuant to Deutsche Industrie Norm 53,504 while shore hardness values were determined in accordance with DIN 52,505.

EXAMPLES

EXAMPLES 1–7

A fluoro-elastomer latex obtained by radical copolymerization and having a pH of 3.1, and containing 0.05 weight percent of ammonium perfluoroctanoate and 23 weight percent of a copolymer of 22.1 mole percent HFP and 77.9 mole percent $VF_2$ ($\eta_{red}$ of an 0.5% solution in acetone at 30° C: 128 ml/g), was precipitated with strong agitation in a high-speed mixer with the amounts given in the table of crosslinking agent and accelerator, which have previously been dissolved in methanol, with heating in some cases. If the precipitation was not quite complete, a 10% solution of $MgCl_2$ was added, until the liquor was clear. Then the coagulate was strained out, washed superficially with desalted water, squeezed out, and dried on a laboratory drying roller for 5 minutes at 100° C.

200 g of the roller skin thus obtained was mixed with 60 g of carbon black, 6 g of magnesium oxide 12 g of calcium hydroxide and 2 g of polyethylene wax of low molecular weight on a water-cooled roller for 15 minutes. From the sheet thus obtained, pieces of 6 mm and 1 mm thickness were prepared by 15 minutes of pressing at 180° C, and at a pressure of 300 kp/cm$^2$ in a suitable chromium plated press mold. This was followed by post-vulcanization by heating in a drying oven, the temperature being gradually raised from 100° to 230° C over a period of 5 hours, and then held at 230° C for 24 hours.

TABLE

Examples 1–7

| Example | Crosslinking Agent (g*) | Accelerator (g*) | Additional Precipitation with $MgCl_2$ | Evaluation of Vulcanizate | Shore A | Compression Set (%) *** | Tensile strength (kp/cm$^2$/Elongation at rupture (%)) |
|---|---|---|---|---|---|---|---|
| 1 | Bisphenol A (2.1) | Benzyl-Phe$_3$P$^+$ClO$_4^-$ (0.3) | + | flawless | 70 | 21 | 120/290 |
| 2 | Phenolphthalein (2.25) | Allyl-Phe$_3$P$^+$ClO$_4^-$ (0.5) | − | flawless | 70 | 16 | 150/260 |
| 3 | Phenolphthalein (2.25) | Bu-Phe$_3$P$^+$ClO$_4^-$ (0.5) | − | flawless | 72.5 | 17 | 130/225 |
| 4 | Bisphenol Z (1.9) | C$_{12}$-Et$_3$N$^+$ClO$_4^-$ (0.5) | + | flawless | 71.5 | 23 | 130/310 |
| 5 | Phenolphthalein (2.25) | Benzyl-Et$_3$N$^+$ClO$_4^-$ (0.5) | − | flawless | 68.5 | 18 | 145/285 |
| 6 | p,p-Biphenol (1,4**) | Octyl-Bu$_3$N$^+$ClO$_4^-$ (0.5) | + | flawless | 72.5 | 15 | 140/225 |
| 7 | Bisphenol AF (2.35) | Bu$_4$N$^+$ClO$_4^-$ (0.5) | − | flawless | 73.5 | 14 | 140/230 |

Abbreviations:
Bisphenol AF = Hexafluorisopropylidene-bis-4-hydroxybenzene
Bisphenol Z = 1,1-bis-(p-hydroxyphenyl)-cyclohexane
Benzyl-Phe$_3$P$^+$ClO$_4$ = Benzyltriphenylphosphonium perchlorate
Allyl-Phe$_3$P$^+$ClO$_4$ = Allyltriphenylphosphonium perchlorate
Bu-Phe$_3$P$^+$ClO$_4$ = n-Butyltriphenylphosphonium perchlorate
C$_{12}$-Et$_3$N$^+$ClO$_4$ = n-Dodecyltriethylammonium perchlorate
Benzyl-Et$_3$N$^+$ClO$_4$ = Benzyltriethylammonium perchlorate
Octyl-Bu$_3$N$^+$ClO$_4$ = n-Octyl-tri-n-butylammonium perchlorate
Bu$_4$N$^+$ClO$_4$ = Tetra-n-butylammonium perchlorate

*per 100 g of water-free elastomer
**+0.6 g 2,2'-Dihydroxy-4,4'-dimethoxybenzophenone
***200° C, 70 hours

EXAMPLES 8–14

A fluoro-elastomer latex obtained by radical copolymerization and having a pH of 3.1, and containing 0.05% of ammonium perfluoroctanoate by weight plus 22% by weight of a copolymer composed of 21.7 mole percent HFP and 78.3 mole percent VF$_2$ ($\eta_{red}$) of an 0.5% solution in acetone at 30° C: 145 ml/g), was precipitated with strong agitation in a high-speed mixer with the stated amounts of crosslinking agent and accelerator, each dissolved in methanol. If the precipitation was not quite complete, 10% aqueous MgCl$_2$ solution was added until the liquor was clear. Then the coagulate was strained out, washed superficially with a small amount of desalted water, squeezed out, and dried for 5 minutes on a laboratory roller dryer at 100° C.

200 g of the roller skin thus obtained was mixed with 60 g of carbon black (medium thermal carbon black), 6 g of a magnesium oxide obtainable commercially under the name "Maglite D" by Merck & Co., 12 g of calcium hydroxide, and 2 g of polyethylene wax of low molecular weight, in a water-cooled roller mixer for 15 minutes. From the roller skin thus obtained, vulcanizates (plates) of 6 mm and 1 mm thickness were prepared by 15 minutes of pressing at 180° C and a pressure of 300 kp/cm$^2$ in an appropriate chromium-plated mold. Then the specimens were gradually heated in an oven from 100° to 230° C over a period of 5 hours and cured for 24 hours at 23° C. The compression set (at constant deformation) pursuant to DIN 53,517 was measured on specimens 6 mm thick at a temperature of 200° C and a time of 70 hours. The tensile strength and elongation at rupture were measured on 1 mm thick specimens (standard specimen S-1) pursuant to DIN 53,504. Table 2 summarizes Examples 8–14.

TABLE 2

Examples 8–14

| Ex. | Cross linking Agent (g*) | Accelerator (g*) | Additional precipitation with $MgCl_2$ | Evaluation of Vulcanizate (pressed plate) | Shore A | Compression Set (%) | Tensile strength (kp/cm$^2$/Elongation at rupture (%) |
|---|---|---|---|---|---|---|---|
| 8 | Bisphenol A (2.1) | Benzyl-Phe$_3$ p$^+$Cl$^-$ (0.3) | − | flawless | 72 | 29 | 120/275 |
| 9 | Bisphenol S (3.0) | Me-Oct$_3$ N$^+$Cl$^-$ (0.5) | + | " | 70 | 40 | 125/390 |
| 10 | Bisphenol AF (2.35) | Et-cHex$_2$N (2.1) | − | " | 74 | 30 | |
| 11 | Bisphenol AF (2.7) | Allyl-Phe$_3$P$^+$ Cl$^-$ (0.5) | − | " | 73.5 | 16 | 135/215 |
| 12 | p,p'-Biphenol (1.6)** | cHex$_2$NH** (1,8) | − | rather soft, otherwise flawless | 73 | 35 | |
| 13 | p,p'-Biphenol (1.6) | Benzyl-Phe$_3$ P$^+$Cl$^-$ (0.5) | − | flawless | 72 | 13 | 130/190 |
| 14 | Phenolphthalein (3.2) | Me-Oct$_3$N$^+$Cl$^-$ (0.5)*** | + | " | 78 | 13 | |

*per 100 g of water-free elastomer
**Crosslinking agent and accelerator are added in separate solutions
***see Appendix at end for explanation of abbreviations

EXAMPLES 15–17

A fluoro-elastomer latex obtained by radical copolymerization and having a pH of 3.0, and which contains 0.05 weight percent of ammonium perfluoroctanoate and 19 weight percent of a copolymer of 21.0 mole percent HFP and 79.0 mole percent VF$_2$ ($\eta_{red}$ of an 0.5% solution in acetone, measured at 30° C: 240 ml/g), was precipitated as in Examples 8 to 14 with the stated amounts of crosslinking agent and accelerator. The material dried on the roller as in Examples 8–14 was mixed with the additives and crosslinked as described therein. Table 3 summarizes Examples 15–17.

TABLE 3

Examples 15–17

| Ex. | Crosslinking Agent (g*) | Accelerator (g*) | Additional precipitation with MgCl$_2$ | Evaluation of Vulcanizate (pressed plate) | Shore A | Compression Set (%) | Tensile strength (kp/cm$^2$/Elongation at rupture (%)) |
|---|---|---|---|---|---|---|---|
| 15 | Bisphenol A (2.1) p,p'-Biphenol (1.6) | Me-Oct$_3$N$^+$Cl$^-$ (0.5) | + | flawless | 75.5 | 19 | 130/225 |
| 16 | | Me-Oct$_3$N$^+$Cl$^-$ (0.1) (Allyl-Phe$_3$P$^+$Cl$^-$(0.4) | – | " | 69 | 15 | 160/225 |
| 17 | 2,4-Dihydroxy-benzophenon (1.9) | Me-Oct$_3$ N$^+$Cl$^-$ (0.5)** | + | " | 74.5 | 22 | 150/205 |

*per 100 g of water-free elastomer
**see Appendix at end for explanation of abbreviations

EXAMPLES 18–19

The fluoro-elastomer latex described in Examples 15–17 was precipitated in the high-speed mixer with the stated amounts of vulcanization accelerator and dried as described therein.

200 g of the roller skin thus obtained was mixed with 60 g of carbon black, 6 g of magnesium oxide, 12 g of calcium hydroxide, 2 g of polyethylene wax of low molecular weight, and the stated amount of crosslinking agent in the manner described in Examples 8 to 14 and was vulcanized as described therein. Table 4 shows the results.

APPENDIX

Abbreviations used in Tables 2 to 5

| | | |
|---|---|---|
| Benzyl-Phe$_3$P$^+$Cl | = | benzyltriphenylphosphonium chloride |
| Me-Oct$_3$N$^+$Cl | = | methyltrioctylammonium chloride |
| Et-cHex$_2$N | = | ethyldicyclohexylamine |
| Allyl-Phe$_3$P$^+$Cl | = | allyltriphenylphosphonium chloride |
| cHex$_2$NH | = | dicyclohexylamine |
| Bu$_4$N$^+$I | = | tetrabutylammonium iodide |

What is claimed is:

1. A process for coagulating a fluoro-elastomer in an aqueous medium which comprises adding to an aqueous acidic medium thereof an organic base or salt thereof which acts as a vulcanization accelerator

TABLE 4

Examples 18–19

| Ex. | Accelerator (g*) | Crosslinking agent added in grams per 100 Grams of elastomer | Evaluation of Vulcanizate (pressed plate) | Shore A | Compression Set (%) | Tensile strength (kp/cm$^2$/Elongation at rupture (%) |
|---|---|---|---|---|---|---|---|
| 18 | Bu$_4$ N$^+$J$^-$ (0,5) | Hydroquinone (1.0) | flawless | 74 | 16 | 135/170 |
| 19 | Allyl-Phe$_3$ P$^+$Cl$^-$ (0.5)** | 4,4'-Dihydroxybenzophenon (1.8) | " | 72.5 | 11 | 180/225 |

*per 100 g of water-free elastomer
**see Appendix at end for explanation of abbreviations

EXAMPLES 20 and 21

(for comparison with Examples 8 and 9

The fluoro-elastomer latex as in Examples 8–14 was treated with aqueous MgCl$_2$ solution in a high speed mixer until the coagulation had ended. The coagulate was strained out, thoroughly washed with desalted water, and dried at 70° C in a fresh-air drying oven.

200 g of dry fluoro-elastomer was mixed with 60 g of carbon black, 6 g of magnesium oxide, 12 g of calcium hydroxide, 2 g of polyethylene of low molecular weight, and the amount of accelerator and crosslinking agent given in Table 5, in a water-cooled roller mixer for 15 minutes, and vulcanized precisely as in Examples 8–14.

wherein said organic base of salt is secondary or tertiary aliphatic, cycloaliphatic, heterocyclic or araliphatic monofunctional amine having a boiling point of greater than 150° C, a quaternary aliphatic, cycloaliphatic, araliphatic or heterocyclic ammonium compound, a quanternary aliphatic, cycloaliphatic, araliphatic phosphonium compound or a mixture thereof.

2. A process according to claim 1 wherein the amount of organic base or salt thereof is between 0.2 and 20 millimoles per 100 g of anhydrous elastomer.

3. A process according to claim 1 wherein the organic base or salt thereof is a quaternary ammonium compound of the formula

TABLE 5

Examples 20–21 (for comparison)

| Ex. | For comparison with Example | Crosslinking agent added in grams per 100 grams of elastomer | Accelerator added in grams per 100 grams of elastomer | Evaluation of Vulcanizate (pressed plate) | Shore A | Compression set (%) | Tensile strength (kp/cm$^2$/Elongation at rupture (%) |
|---|---|---|---|---|---|---|---|
| 20 | 8 | Bisphenol A (2.1) | Benzyl-Phe$_3$P$^+$Cl$^-$ (0.3) | weak crosslinking pitted | | cannot be measured | |
| 21 | g | Bisphenol S (3.0) | Me-Oct$_3$N$^+$Cl$^-$ (0.5)* ** | not crosslinked | | " | |

*adsorbed on silica (Aerosil) in a ratio of 1:1
**see Appendix at end for explanation of abbreviations

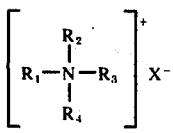

wherein $R_1$, $R_2$ and $R_3$ and $R_4$ each independently represent a $C_1$-$C_{20}$ alkyl group, a fluroalkyl group having 1 to 20 carbon atoms, an aralkyl group wherein the alkyl portion contains 1 to 20 carbon atoms, a polyhydroxy alkylene or polyhydroxy fluoroalkylene radical wherein at least two of such radicals are alkyl or aralkyl radicals and X is hydroxyl, halide, sulfate, perchlorate, carbonate, pentachlorothiophenylate, tetrafluoroborate, hexafluorosilicate, hexafluorophosphate, dimethylphosphate or $C_1$-$C_{20}$ alkyl, aralkyl or aryl carboxylate or aryl dicarboxylate.

4. A process according to claim 1 wherein the organic base or salt thereof is a quaternary ammonium compound having the general formula

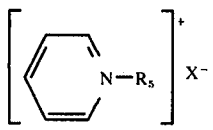

wherein $R_5$ is a $C_1$-$C_{20}$ alkyl radical and X is hydroxyl, halide, sulfate, perchlorate, carbonate, pentachlorothiophenylate, tetrafluoroborate, hexafluorosilicate, hexafluorophosphate, dimethylphosphate or a $C_1$-$C_{20}$ alkyl, aralkyl or aryl carboxylate or aryl dicarboxylate.

5. A process according to claim 1 wherein the quaternary ammonium compound has the formula

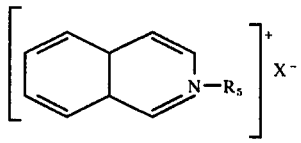

wherein $R_5$ represents a $C_1$-$C_{20}$ alkyl radical and X represents hydroxyl, halide, sulfate, perchlorate, carbonate, pentachlorothiophenylate, tetrafluoroborate, hexafluorosilicate, hexafluorophosphate, dimethylphosphate or a $C_1$-$C_{20}$ alkyl, aralkyl or aryl carboxylate or aryl dicarboxylate.

6. A process according to claim 1 wherein the organic base is a quaternary ammonium halide selected from the group consisting of tetrabutylammonium iodide, hexadecyltrimethylammonium chloride and methyltrioctylammonium chloride.

7. A process according to claim 1 wherein the organic base is a quaternary phosphonium compound selected from the group consisting of butyltriphenylphosphonium bromide, butyltriphenylphosphonium chloride, dodecyltriphenylphosphoniumbromide, dodecyltriphenylphosphonium chloride, benzyltriphenylphosphonium chloride, benzyltriphenylphosphonium bromide, allyltriphenylphosphonium chloride and allyltriphenylphosphonium bromide, or a corresponding quaternary phosphonium base thereof.

8. A process according to claim 1 wherein a quaternary phosphonium compound is employed as the organic base or salt which quaternary ammonium compound contains four organic radicals bounded to the phosphorus atom each of which may be identical or different each of which radical contains 1 to 20 carbon atoms and is linear, branched or cyclic, saturated or unsaturated and can contain a nitrogen, oxygen or sulfur hetero atom in the chain and the anion is selected from the group consisting of hydroxyl, chloride, bromide, methoxy, acetate, mercaptate, sulfate, bisulfate and perchlorate.

9. A process according to claim 8 wherein the organic radical bonded to the phosphorus atom of the quaternary phosphonium compound is an alkyl or alkenyl group.

10. A process according to claim 1 wherein a quaternary ammonium compound is employed as the organic base or salt which quaternary ammonium compound is in the form of a salt which has a solubility in water of less than 0.2 g per 100 ml. determined at 25° C.

11. A process according to claim 10 wherein said ammonium salt is selected from the group consisting of trimethylhexadecylammonium chloride and methyl-trioctylammonium chloride.

12. A process according to claim 1 wherein the organic base is a quaternary phosphonium perchlorate, the four organic radicals bonded thereto each having between 1 and 20 carbon atoms in the chain which radicals are linear, branched, or cyclic, saturated or unsaturated and can contain an oxygen, nitrogen or sulfur atom in the chain.

13. A process according to claim 12 wherein each organic radical bonded to the phosphorus atom is alkyl, alkenyl, aryl or aralkyl.

14. A process according to claim 1 wherein the organic base or salt thereof is a quaternary aliphatic ammonium perchlorate wherein the aliphatic groups each contain 1 to 20 carbon atoms in the chain.

15. A process according to claim 14 wherein the quaternary aliphatic ammonium perchlorate is selected from the group consisting of tetrabutylammonium perchlorate, hexadecyltrimethylammonium perchlorate, methyltrioctylammonium perchlorate, n-dodecyltriethylammonium perchlorate and n-octyltri-n-butylammonium perchlorate.

16. A process according to claim 1 wherein the amount of organic base added to the dispersion is between 0.5 and 5 millimoles per 100 grams of anhydrous elastomer.

17. A process according to claim 1 wherein the organic base is selected from the group consisting of tetramethylammonium hydroxide, tetramethylammoniumpentachlorothiophenolate, lauryldimethylnaphthylmethylammonium chloride, laurylisoquinoline chloride, distearyldimethylammonium chloride, tetrahexylammonium tetrafluoroborate, methyltrioctylammonium oxalate, hexadecylpyridinium chloride, benzyltrioctylammonium chloride, diisobutylphenoxyethoxyethyldimethoxybenzyl chloride, methoxyethoxyethyltrioctylammonium chloride, and 2,2,3,3-tetrafluoropropyltrioctylammonium chloride.

18. A process according to claim 1 wherein the organic base is selected from the group consisting of dibutylamine, dicyclohexylamine, tributylamine and ethyldicyclohexylamine or a salt thereof.

19. A process according to claim 1 wherein there is additionally added to the fluoro-elastomer dispersion a hydroxy compound which acts as a vulcanizer.

20. A process according to claim 19 wherein the hydroxy compound is a mononuclear or polynuclear aromatic hydroxy compound.

21. A process according to claim 20 wherein said mononuclear, polynuclear aromatic hydroxy compound has a solubility in water of less than 1 g per 100 ml. water determined at 25° C.

22. A process according to claim 20 wherein the hydroxy compound has the formula

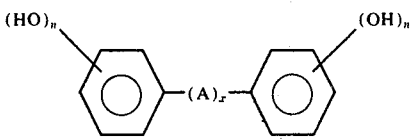

wherein A is a bifunctional aliphatic, cycloaliphatic or aromatic radical having 1 to 13 carbon atoms, a thio, oxy, carbonyl, sulfonyl or sulfone radical or a radical of the formula

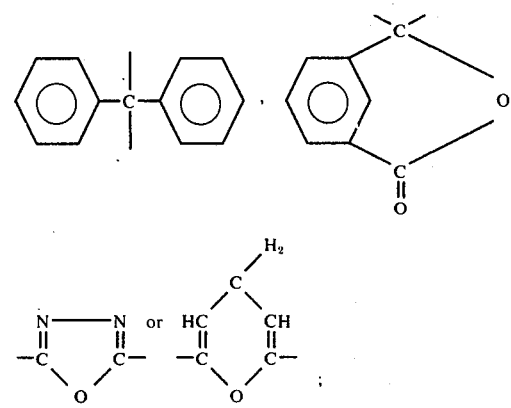

X is 0 or 1 and $n$ is 1 or 2.

23. A process according to claim 19 wherein the hydroxy compound is a di-, tri- or tetra hydroxybenzene, naphthylene or anthracene.

24. A process according to claim 19 wherein the hydroxy compound is selected from the group consisting of a dihydroxybiphenyl, a dihydroxy compound of a bisphenol, 2,2′,4,4′-tetrahydroxybenzophenone, pyrocatechol, resorcinol, 2-methylresorcinol, 5-methylresorcinol, 2-methylhydroquinone, 2,5-dimethylhydroquinone, 2-tert.-butyl-hydroquinone, hydroquinone, 1,4,9,10-tetrahydroxyanthracene, 2,4-dihydroxybenzoic acid, 2,6-dihydroxyanthraquinone, 3,6-dihydroxyanthraquinone, pyromellitic acid-bis-(p-hydroxyphenylimide), 2,4-dihydroxyacetophenone, 4,4′-dihydroxydiphenylsulfoxide, 2,4-dibenzoresorcinol, 2,4,5-trihydroxybutryophenone, dihydroxybenzophenone, phenolphthalein and 2,4-dihydroxybenzaldehyde.

25. A process according to claim 24 wherein the hydroxy compound is a dihydroxy compound of a bisphenol which bisphenol is selected from the group consisting of bisphenol A, bisphenol AF, bisphenol S and bisphenol Z.

26. A process according to claim 19 wherein the hydroxy compound is added in the form of a solution in methanol, ethanol, acetone, dimethylformamide or dimethylsulfoxide.

27. A process according to claim 2 wherein the organic base is benzyltriphenylphosphonium perchlorate.

28. A process according to claim 2 wherein the organic base is allyltriphenylphosphonium perchlorate.

29. A process according to claim 2 wherein the organic base is n-butyl-triphenylphosphonium perchlorate.

30. A process according to claim 2 wherein the organic base is n-dodecyltriethylammonium perchlorate.

31. A process according to claim 2 wherein the organic base is benzyltriethylammonium perchlorate.

32. A process according to claim 2 wherein the organic base is n-octyl-tri-n-butylammonium perchlorate.

33. A process according to claim 2 wherein the organic base is benzyltriphenylphosphonium chloride.

34. A process according to claim 2 wherein the organic base is methyltrioctylammonium chloride.

35. A process according to claim 2 wherein the organic base is ethyldicyclohexylamine.

36. A process according to claim 2 wherein the organic base is tetra-n-butylammonium perchlorate.

37. A process according to claim 2 wherein the organic base is allyltriphenylphosphonium chloride.

38. A process according to claim 2 wherein the organic base is dicyclohexylamine.

39. A process according to claim 2 wherein the organic base is tetrabutylammonium iodide.

40. A process according to claim 19 wherein the hydroxy compound is added in an amount of between 5 and 15 millimoles per 100 g of water-free fluoro-elastomer.

41. A process according to claim 40 wherein the hydroxy compound is bisphenol A.

42. A process according to claim 40 wherein the hydroxy compound is phenolphthalein.

43. A process according to claim 40 wherein the hydroxy compound is bisphenol Z.

44. A process according to claim 40 wherein the hydroxy compound is p,p′-bisphenol.

45. A process according to claim 40 wherein the hydroxy compound is bisphenol AF.

46. A process according to claim 40 wherein the hydroxy compound is bisphenol S.

47. A process according to claim 40 wherein the hydroxy compound is 2,4,-dihydroxybenzophenone.

* * * * *